United States Patent [19]

Sundström

[11] Patent Number: 5,564,996
[45] Date of Patent: Oct. 15, 1996

[54] DRIVE SPROCKET ASSEMBLY FOR CHAIN SAWS

[75] Inventor: Erik Sundström, Sandviken, Sweden

[73] Assignee: Sandvik AB, Sandviken, Sweden

[21] Appl. No.: 488,915

[22] Filed: Jun. 9, 1995

[30] Foreign Application Priority Data

Jun. 9, 1994 [SE] Sweden ................................ 9401995

[51] Int. Cl.⁶ .................................................... F16H 55/12
[52] U.S. Cl. ............................................ 474/162; 474/164
[58] Field of Search .................................. 474/153–155, 474/137, 162–164

[56] References Cited

U.S. PATENT DOCUMENTS

| | | |
|---|---|---|
| 1,773,288 | 8/1930 | Valletta . |
| 1,825,164 | 9/1931 | Skillman . |
| 1,964,780 | 7/1934 | Ziegler ........................... 474/162 |
| 2,409,775 | 10/1946 | Mall et al. . |
| 2,884,798 | 5/1959 | Wilson . |
| 3,669,162 | 6/1972 | Irgens . |

FOREIGN PATENT DOCUMENTS

WO95/06549  3/1995  WIPO .

*Primary Examiner*—Roger J. Schoeppel
*Attorney, Agent, or Firm*—Burns, Doane, Swecker & Mathis, L.L.P.

[57] ABSTRACT

Drive sprocket assembly for chain saws, where a saw chain runs around a loose drive ring that rolls upon cylindrical surfaces of a drive sprocket. Drive links of the saw chain project through holes of the drive ring and enter recesses of the drive sprocket to be driven thereby. The recesses of the drive sprocket have an axial dimension substantially larger than the thickness of the drive links, to enable the drive ring and chain to have substantial axial play relative to the drive sprocket.

9 Claims, 2 Drawing Sheets

5,564,996

DRIVE SPROCKET ASSEMBLY FOR CHAIN SAWS

BACKGROUND OF THE INVENTION

The present invention relates generally to chain saws and, in particular, to a drive sprocket assembly for driving a saw chain.

In Swedish Patent Application 9302842-1 (PCT WO95/06549) there is shown a drive sprocket device for chain saws, where the saw chain runs around a loose outer drive ring rolling on an inner drive rim sprocket. A rim sprocket is characterized by having an outer periphery with an annular row of recesses which can receive the radially inner ends of the drive links of the saw chain. The width of the recesses only slightly exceeds the thickness of the drive links, and the recesses on each side are bordered by smooth cylindrical surfaces of the rim sprocket. With this device the saw chain when it is moving will always be automatically tensioned with a force proportional to the cutting force. This reduces wear and improves safety.

In older chain saw designs with gears between the motor and the drive sprocket, the sprocket was usually of a rim type and fastened to the end of the drive shaft without axial mobility (play), as disclosed in U.S. Pat. No. 2,884,798. Newer chain saws with direct drive have the usual rim sprockets arranged to be axially slidable on a hollow spline shaft fastened to the clutch drum, allowing a certain axial mobility of the clutch drum, and permitting the use of guide bars of different thicknesses or having some deformation. The hollow shaft is jounaled on the drive shaft and axially secured with a locking ring on the drive shaft end.

To allow the use of lightweight high speed motors without excessive chain speed, the drive sprocket diameter has to be small, which has resulted in the need to reduce the size of the splines. It is thus difficult to make splines with sufficient strength, if rim wheels are to be used.

SUMMARY OF THE INVENTION

The present invention concerns a drive sprocket device which allows a certain axial play of the saw chain and the drive ring without using a traditional rim sprocket, which results in longer life and higher safety for the components of the saw chain and the drive sprocket device, in spite of the small diameters involved.

BRIEF DESCRIPTION OF THE DRAWING

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
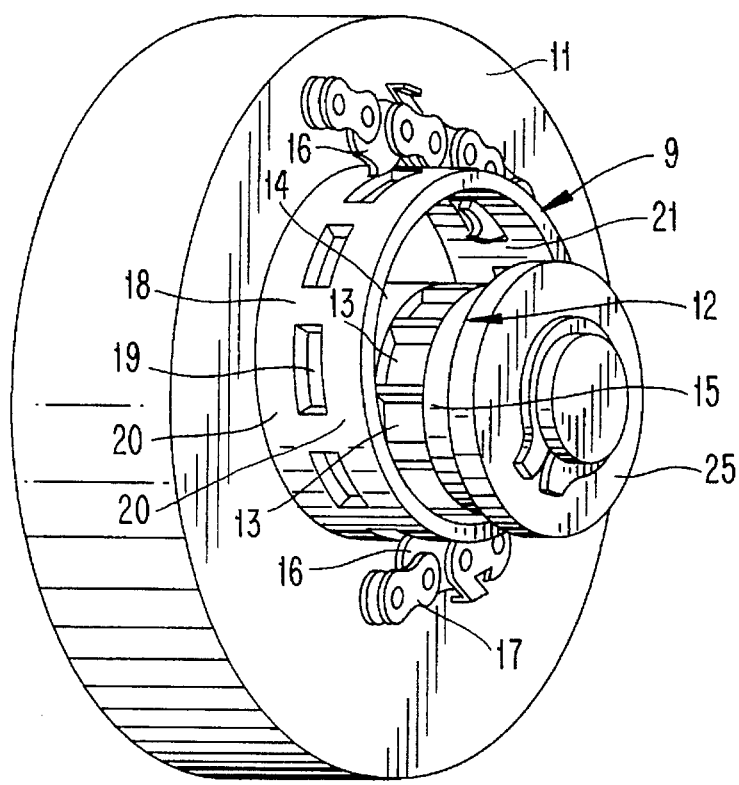
FIG. 1 shows a clutch drum with a sprocket assembly according to the invention.

FIG. 1 shows a clutch drum 11 rotatable around the drive shaft of a motor. Drive torque is transferred to the inside of the drum when the speed of the motor is high enough. The drum is joined to a drive sprocket assembly 9 which comprises a drive sprocket 12 and a drive ring 18. In particular, the clutch drum is fixed to the drive sprocket 12 in a known manner by brazing, welding, riveting or the like. The outside periphery of the sprocket 12 comprises an annular row of circumferentially spaced recesses 13. Disposed at opposite axial sides of the recess are respective cylindrical surfaces 14, 15. In traditional rim sprockets, the width W of the recesses, measured in an axial direction A (see FIG. 2), is barely larger than the thickness of the drive links 16 of the saw chain, in order to ensure that the side links 17 of the chain are adequately supported. In contrast, the drive sprocket 12 according to the present invention has recesses 13 with a width considerably larger than the thickness of the drive links 16, e.g., the recess width W is at least twice the size of the width of the drive link 16, providing the saw chain with a considerable axial play (e.g., an axial play equal at least to the width of the drive link). This considerable axial play allows the use of guide bars of different thickness and improves safety during hard work when the guide bar may become slightly deformed.

The drive ring 18, having a larger diameter than the sprocket 12, is freely rolling against the outer surface of the sprocket. The drive ring is penetrated by a number of generally rectangular holes 19, the number of which is greater than the number of recesses 13 in the sprocket. These holes have a width in the axial direction barely larger than the thickness of the drive links 16. The drive links extend through the holes 19 and enter the recesses 13. Tangential force is transmitted to the chain by the contact between the drive links and the sprocket recesses. The chain is radially supported by the side links 17 resting against continuous cylindrical surfaces 20 of the drive ring on both sides of the holes 19. The drive ring 18 is radially supported because cylindrical surfaces 21 on the inside of the ring roll against the smaller diameter cylindrical surfaces 14, 15 on the sprocket. The cylindrical surfaces on the sprocket or on the inside of the drive ring, or both, should have such a width that they overlap to some extend with any possible axial displacement of the drive links 16 relative to the recesses 13.

Figure 2A:
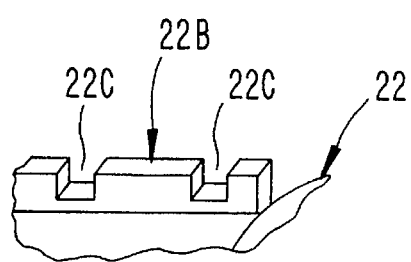
FIG. 2A is a fragmentary perspective view of a drive sprocket shown in FIG. 2, with the circumferential rings omitted therefrom.
Figure 2B:
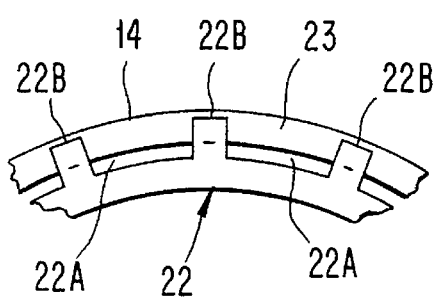
FIG. 2B is a fragmentary end view of the drive sprocket shown in FIG. 2.
Figure 2:
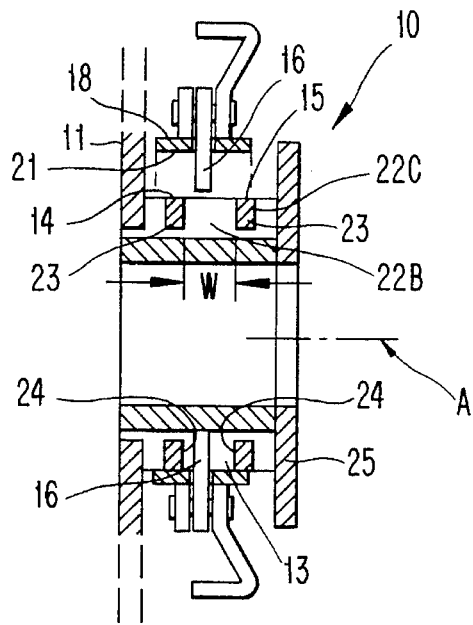
FIG. 2 is an axial section taken through one preferred drive socket assembly according to the invention.

FIGS. 2, 2A, 2B show in cross section another preferred embodiment of the drive sprocket assembly 10 comprising a drive sprocket and the drive ring 18. The drive sprocket comprises a part 22 having recesses 22A to transmit tangential forces to the saw chain. That part may be an extruded tubular part with axial ridges 22B spaced circumferentially apart to form the recesses 22A (see FIGS. 2A, 2B). Two tangential grooves 22C have been machined through each of the ridges 22B where two split elastic rings 23 are received, in a manner disclosed in U.S. Pat. No. 3,410,147. According to the invention, the distance between the grooves 22C should be considerably larger than in that patent, preferably at least twice the drive link thickness. The outer peripheries of the elastic rings 23 are of larger diameter than the outer surfaces of the ridges 22B, and thus constitute the cylindrical surfaces 14, 15 against which the inside surface 21 of the drive ring is rolling. The end surfaces 24 of the elastic rings may be slightly tapered to keep the drive links from climbing the elastic rings when they enter the recesses 13 formed between the ridges and the elastic rings. To keep the drive ring from falling off when a chain is being mounted or removed, an end washer 25 with a larger diameter can be mounted on the end of the tubular part 22 facing away from the drum 11, and either be of one piece with the tubular part or the elastic ring, or be separate therefrom and held by the end of the drive shaft.

The axial mobility (play) of the saw chain is equal to either the difference between the distance between elastic rings and the thickness of the drive links, or the difference between the distance from the clutch drum 11 to the washer 25 and the width of the drive ring 18, whichever is smallest. The drive ring 18 may have a uniform thickness along its axial dimension as shown in FIG. 2, or it may have a radial flange at one or both axial ends.

Figure 3:
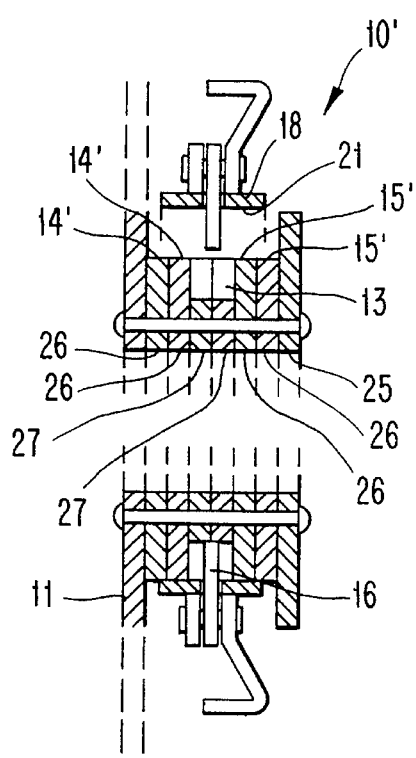
FIG. 3 is an axial section taken through another preferred drive sprocket assembly according to the invention.
Figure 3A:
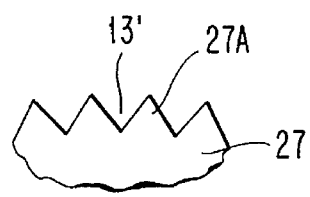
FIG. 3A is a fragmentary end view of a star-shaped wheel of the drive sprocket assembly shown in FIG. 3.

FIGS. 3 and 3A show another embodiment of a drive sprocket assembly 10' according to the invention, where the sprocket is assembled from a number of flat metal parts riveted or brazed to the drum. The flat metal parts comprise at least two round washers 26, the outer peripheries of which constitute the cylindrical surfaces 14', 15' against which the inside of the drive ring is rolling, as well as one or more star-shaped parts 27 having radial projections 27A forming recesses 13' for transmitting tangential force to the saw chain. The combined thicknesses of the star-shaped parts 27 should be considerably larger than the thickness of the drive links, preferably about twice as large. To keep the drive ring from falling off, an end washer 25 can be attached to one of the round washers 26 or to the drive shaft.

Figure 4:
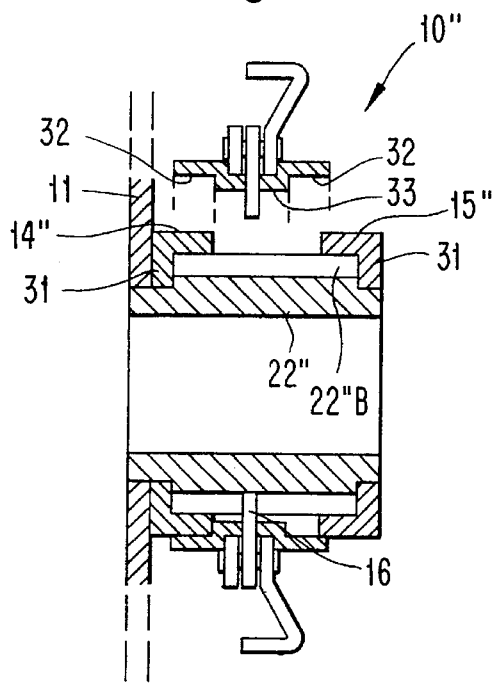
FIG. 4 is an axial section taken through yet another preferred drive sprocket assembly according to the invention.

FIG. 4 shows still another embodiment of a drive sprocket assembly 10" where a tubular part 22" with external ridges 22"B similar to those of FIG. 2 (without grooves 22C) is attached to the clutch drum and to two angular profile rings 31 by brazing, welding or riveting. The outsides of the profile rings constitute the cylindrical surfaces 14", 15" against which the inside 21 of the drive ring is rolling. If the outsides of the profile rings 31 have a larger radius than the ridges, the drive ring may be made with a center ridge 33. If needed for strength or to avoid falling off, the drive ring or the profile rings may be made with flanges.

Combinations of the mentioned embodiments are also possible within the concept of the invention, such as drive sprockets with one elastic ring as in FIG. 2 and one profile ring as in FIG. 4.

The invention can also be applied to machines where no clutch drum is used, such as with electric or hydraulic drive. In such cases there may be end washers at both ends of the sprocket.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A drive sprocket assembly for driving a saw chain, comprising:
   an axially stationary drive sprocket rotatable about an axis and including axially spaced cylindrical outer surfaces and circumferentially spaced recesses disposed between said cylindrical outer surfaces;
   a drive ring having an inner cylindrical surface of larger diameter than said cylindrical outer surfaces and loosely mounted on and supported by said drive sprocket, said drive ring including circumferentially spaced holes;
   said saw chain traveling around an outer surface of said drive ring and including drive links projecting through said holes and being receivable in said recesses to be driven by said drive sprocket;
   said recesses having an axial dimension extending parallel to said axis and which is larger than an axial dimension of the holes and substantially larger than a thickness of said drive links to enable said drive ring and saw chain to have substantial axial play relative to said drive sprocket.

2. The assembly according to claim 1 further including a drive shaft, and a clutch drum operably connected to said drive shaft, said drive sprocket being connected to said clutch drum.

3. The assembly according to claim 1, wherein said drive sprocket comprises a generally tubular member having axial ridges on its outer periphery, said ridges spaced apart circumferentially to form said recesses; and a pair of axially spaced rings disposed on said ridges to define axial borders of said recesses.

4. The assembly according to claim 3, wherein each ridge includes a pair of axially spaced grooves; said rings mounted in respective grooves.

5. The assembly according to claim 3, wherein said rings have a larger outer diameter than said ridges, whereby outer surfaces of said rings define said cylindrical outer surfaces of said drive sprocket.

6. The assembly according to claim 1, wherein said axial dimension of each recess is at least twice as great as said thickness of said drive links.

7. The assembly according to claim 1, wherein said drive sprocket comprises at least two axially spaced round washers defining said cylindrical outer surfaces, and at least one star-shaped washer disposed between said round washers to form said recesses.

8. The assembly according to claim 1 further including an end washer disposed on an axial end of said drive sprocket to axially retain said drive ring on said drive sprocket.

9. The assembly according to claim 1, wherein said recesses have a greater axial dimension than said holes, said drive links disposed in said holes without appreciable axial play.

* * * * *